(12) United States Patent
Flammer, III (10) Patent No.: US 9,807,733 B2
(45) Date of Patent: Oct. 31, 2017

(54) TRANSCEIVER HOPPING COMMUNICATIONS SYSTEM

(71) Applicant: SILVER SPRINGS NETWORKS, INC., Redwood City, CA (US)

(72) Inventor: George H. Flammer, III, Cupertino, CA (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 916 days.

(21) Appl. No.: 13/738,489

(22) Filed: Jan. 10, 2013

(65) Prior Publication Data

US 2013/0188574 A1 Jul. 25, 2013

Related U.S. Application Data

(60) Provisional application No. 61/588,638, filed on Jan. 19, 2012.

(51) Int. Cl.
*H04W 4/00* (2009.01)
*H04W 72/04* (2009.01)
*H04B 1/713* (2011.01)
*H04W 72/02* (2009.01)

(52) U.S. Cl.
CPC ............ *H04W 72/04* (2013.01); *H04B 1/713* (2013.01); *H04W 72/02* (2013.01)

(58) Field of Classification Search
CPC ....... H04W 72/04; H04W 72/02; H04B 1/713
USPC ............... 370/312–314, 328–330, 341–348; 375/140–147; 455/13.3, 17, 24, 500, 455/509–513, 78–88
See application file for complete search history.

(56) References Cited

U.S. PATENT DOCUMENTS

| | | | |
|---|---|---|---|
| 2006/0268778 A1 | 11/2006 | Kirk et al. | |
| 2008/0101503 A1* | 5/2008 | Gupta | H04B 1/005 375/338 |
| 2008/0151856 A1* | 6/2008 | Glick | H04B 1/0003 370/343 |
| 2009/0086706 A1* | 4/2009 | Huang et al. | 370/349 |
| 2009/0257420 A1 | 10/2009 | Kore et al. | |
| 2010/0316145 A1* | 12/2010 | Yeh | H04B 7/0452 375/260 |
| 2011/0235626 A1* | 9/2011 | Yeon | H04L 1/1671 370/338 |

(Continued)

FOREIGN PATENT DOCUMENTS

| | | |
|---|---|---|
| GB | 2479596 A1 | 10/2011 |
| WO | 9919993 A1 | 4/1999 |

OTHER PUBLICATIONS

International Search Report PCT/US 2013/021567 dated Apr. 5, 2013.

*Primary Examiner* — Thai Hoang
(74) *Attorney, Agent, or Firm* — Artegis Law Group, LLP (57) ABSTRACT

One embodiment of the present invention sets forth a wireless communications system configured to efficiently operate within an arbitrarily and uniquely defined set of channels. Each one of the set of channels has an assigned digital radio transceiver instance configured to operate according to transmission requirements that are unique to the corresponding channel. A set of digital radio transceiver instances comprises a meta-transceiver, which enables communications to one or more other devices via one or more digital radio transceiver instances.

25 Claims, 6 Drawing Sheets

(56) References Cited

U.S. PATENT DOCUMENTS

| | | | |
|---|---|---|---|
| 2012/0052900 A1* | 3/2012 | Liu et al. | 455/515 |
| 2012/0327882 A1* | 12/2012 | Park | H04B 7/0632 370/329 |
| 2013/0058239 A1* | 3/2013 | Wang | H04B 7/0417 370/252 |
| 2013/0188565 A1* | 7/2013 | Wang et al. | 370/329 |
| 2013/0188567 A1* | 7/2013 | Wang | H04L 5/0094 370/329 |
| 2013/0308623 A1* | 11/2013 | Santos | H04L 1/0026 370/342 |
| 2013/0322361 A1* | 12/2013 | Ko | H04B 7/0632 370/329 |
| 2014/0056250 A1* | 2/2014 | Cattoni et al. | 370/329 |

* cited by examiner

TRANSCEIVER HOPPING COMMUNICATIONS SYSTEM

CROSS-REFERENCE TO RELATED APPLICATIONS

This application claims benefit of U.S. provisional patent application Ser. No. 61/588,638, filed Jan. 19, 2012 which is hereby incorporated herein by reference.

BACKGROUND

Technical Field

Embodiments of the present invention relate generally to digital communications systems and, more specifically, to a transceiver hopping communications system.

Description of the Related Art

Radio frequency (RF) transmissions are generally subject to specific regulations, which may vary significantly from region to region. Devices that emit RF signals in a particular region are required to adhere to regulations for the region. These regulations typically specify certain limitations on bandwidth, duration, and effective power for each segment of usable RF spectrum.

Segments of RF spectrum are commonly assigned to different services and may remain assigned for many years. As technology advances and new types of services are deployed, associated devices are frequently required to operate within an existing set of RF spectrum assignments, designed for historic rather than current needs. A mismatch between historic RF spectrum assignments and current RF spectrum needs frequently leads to inefficient overall utilization of RF spectrum. Furthermore, certain new services may require more RF spectrum than is available within any one type of service.

As the foregoing illustrates, what is needed in the art is a technique for more efficiently utilizing existing RF spectrum assignments.

SUMMARY

One embodiment of the present invention sets forth a computer-implemented method for transmitting outbound data to a remote device via a meta-transceiver. The method includes determining that the outbound data should be transmitted, selecting at least one radio frequency (RF) channel for transmitting the outbound data based on a set of transmission requirements for a set of two or more RF channels, and transmitting the outbound data to the remote device via the at least one RF channel. Further, each RF channel in the set of two or more RF channels is associated with an instance of a digital transceiver configured to receive and transmit data via the RF channel.

One advantage of the disclosed technique is that available radio frequency spectrum may be utilized more efficiently by optimizing use of each available portion of frequency spectrum.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
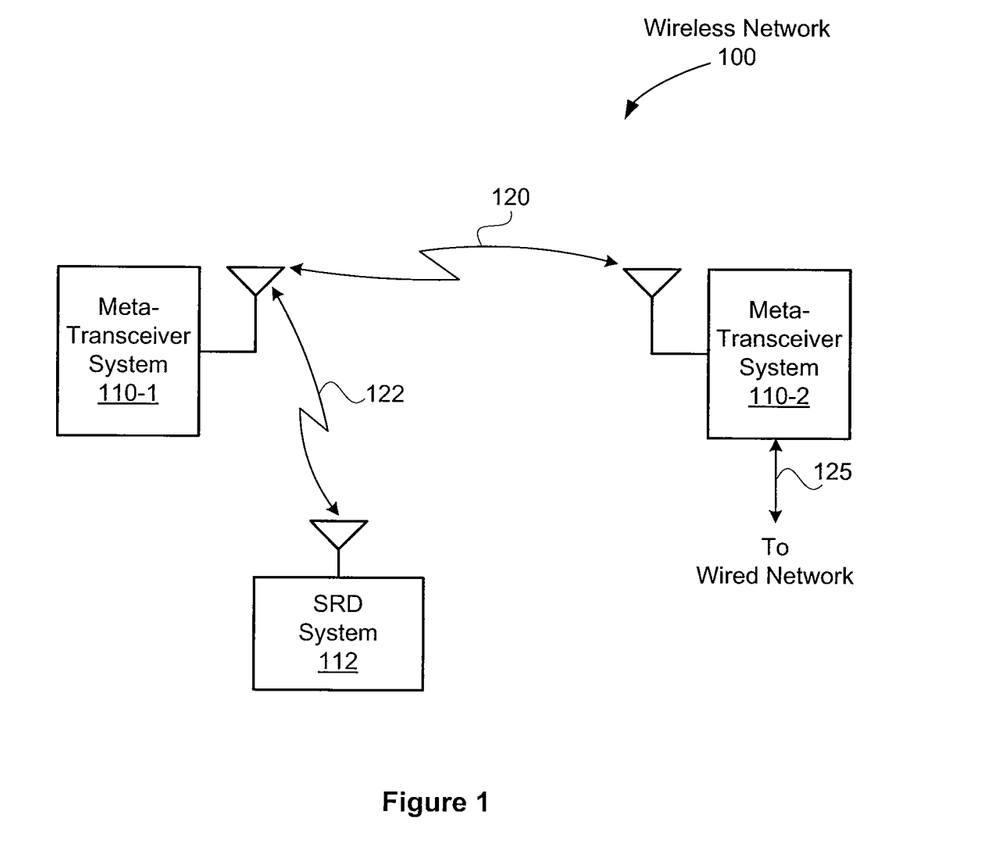
FIG. 1 illustrates a wireless network configured to implement one or more aspects of the present invention.

FIG. 1 illustrates a wireless network 100 configured to implement one or more aspects of the present invention. Wireless network 100 may include a first meta-transceiver system 110-1 configured to communicate with a second meta-transceiver system 110-2 via radio frequency (RF) path 120. Wireless network 100 may also include a shot range device (SRD) system 112 configured to communicate with meta-transceiver system 110-1 via RF path 122.

For a given interval of time, RF path 120 may comprise one or more RF channels, each specified by a corresponding set of transmission requirements. Each one of the one or more RF channels may have a different set of transmission requirements, and each set of transmission requirements may be specified by a corresponding set of regional regulations. For an arbitrary interval of time, RF path 122 may comprise one RF channel specified by a corresponding set of transmission requirements. In a practical scenario, meta-transceiver systems 110-1 and 110-2 are configured to communicate via RF path 120, for example as peers, and one or more meta-transceiver systems 110 may be configured to also act as a bridge between SRD system 112 and other devices associated with wireless network 100. In one embodiment, a meta-transceiver system 110 includes a wired network connection 125 for communicating with a wired network. In certain embodiments, meta-transceiver system 110 is configured to serve as a bridge between wireless network 100 to the wired network. Wired network connection 125 may implement well-known Ethernet protocols or any other technically feasible data communications protocols.

Figure 2A:
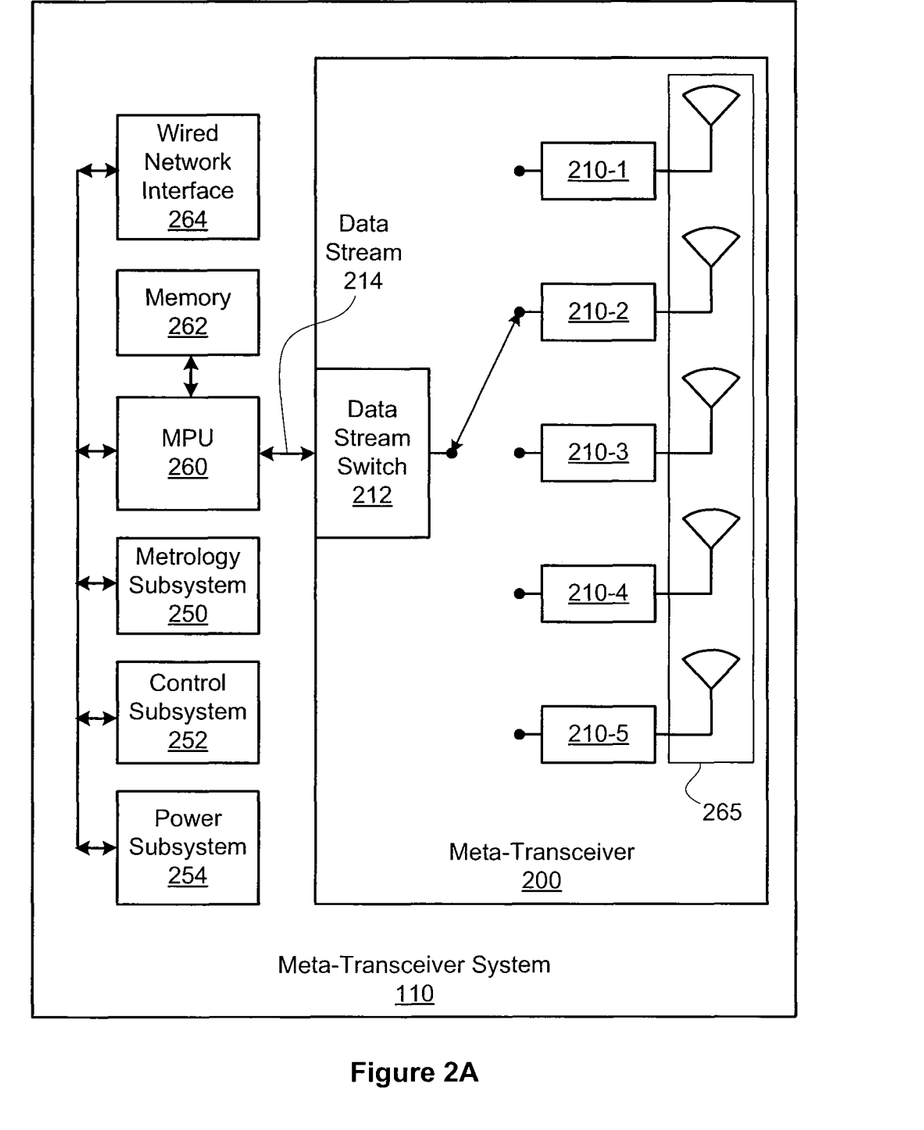
FIG. 2A is a conceptual diagram of a meta-transceiver system, according to one embodiment of the present invention.

FIG. 2A is a conceptual diagram of a meta-transceiver system 110, according to one embodiment of the present invention. As shown, meta-transceiver 110 includes a meta-transceiver 200 and other system components used to implement application-specific features of the meta-transceiver system. For example, meta-transceiver system 110 may also include a microprocessor unit (MPU) 260, a power subsystem 254, a memory system 262, and a wired network interface 264. Certain embodiments also comprise one or more additional elements, such as a metrology subsystem 250 and a control subsystem 252.

MPU 260 includes a processor core configured to retrieve and execute programming instructions from memory system 262, which may comprise volatile and non-volatile storage. During the course of executing the programming instructions, the processor core may retrieve instructions residing within memory system 262, and store to and retrieve data from memory system 262. In one embodiment, the instructions cause MPU 260 to execute an application-specific task defined for meta-transceiver system 110.

Power subsystem 254 comprises regulation and power conversion circuitry configured to provide electrical voltage sources to each circuit and subsystem within meta-transceiver system 110. Power subsystem 254 may also include an energy source such as a photovoltaic system, a battery, or a fuel cell. In one embodiment, meta-transceiver system 110 includes wired network interface 264, configured to enable communication via wired network connection 125 of FIG. 1.

Metrology subsystem 250 comprises circuitry configured to perform one or more measurements, such as voltage, current, power, accumulated power, flow rate, accumulated flow, temperature, humidity, vibration, or any other quantifiable physical value or metric. Metrology subsystem 250 quantizes measured results into corresponding digital values for processing and storage by MPU 260. In one embodiment, metrology subsystem 250 comprises a power meter for measuring accumulated utilization of power. The control system 252 comprises one or more switches for controlling electrical signals. In one embodiment, control system 252 is a power switch for turning electrical power on or off, such as to enable service interruption and service continuation functionality within meta-transceiver system 110.

Meta-transceiver 200 implements two or more instances of digital transceiver 210, a data stream switch 212, and an antenna subsystem 265. Each digital transceiver 210 is configured to implement a digital radio receiver, digital radio transmitter or digital radio transceiver in conformance with a particular set of transmission requirements. Each digital transceiver 210 therefore implements any required listen-before-talk protocols, limitations on power, bandwidth (spectrum capacity), duration, duty-cycle, and modulation techniques appropriate to a particular channel.

Each digital transceiver 210 is responsible for maintaining relevant transmission state independently from other digital transceivers. In one embodiment, this state is maintained by a processing unit, such as MPU 260. In addition to channel transmission requirements and transmission state information, prevailing channel conditions and target device information may be maintained by MPU 260. For example, channels that are noisy or unreliable may be marked as such, and given low priority when a new channel is selected for transmission. Furthermore, each target device may receive data more reliably on certain channels, causing those channels to receive higher priority when a new channel is selected for transmission.

Antenna subsystem 265 converts incident electromagnetic energy into an incoming RF electrical signals and also converts the RF electrical signals for transmission into radiated electromagnetic energy. Antenna subsystem 265 may implement a set of independent antennas, a single antenna configured to operate over an appropriate range of RF spectrum with appropriate inter-channel isolation, or any other technically feasible technique for conversion between electrical and electromagnetic energy.

Data stream switch 212 is configured to select among one or more digital transceivers 210 for establishing communication with another wireless device. Data stream switch 212 may be configured by a control processor, such as MPU 260, to select one or more digital transceivers 210. MPU 260 may receive and transmit data organized as a data stream 214 via one or more digital transceivers 210. Digital transceivers 210 may be configured to simultaneously receive data on a respective channel and notify MPU 260 when a unit of data has been received. MPU 260 may configure one or more digital transceivers 210 to transmit data packets according to corresponding transmission requirements. By utilizing available channels and selecting different channels as dictated by transmission requirements for each channel, a communications session comprising data stream 214 may be maintained between two meta-transceiver systems. The communications session may comprise an abstract construct, such as an abstract data stream or internet-protocol socket. Such abstract constructs do not need visibility into lower-level physical details such as channel selection.

In one embodiment, meta-transceiver 200 is implemented using an RF conversion stage, and a digital signal processor (DSP), as described below in FIG. 3. The DSP is configured to simultaneously generate multiple channels of modulated data and demodulate multiple channels of data.

Figure 2B:
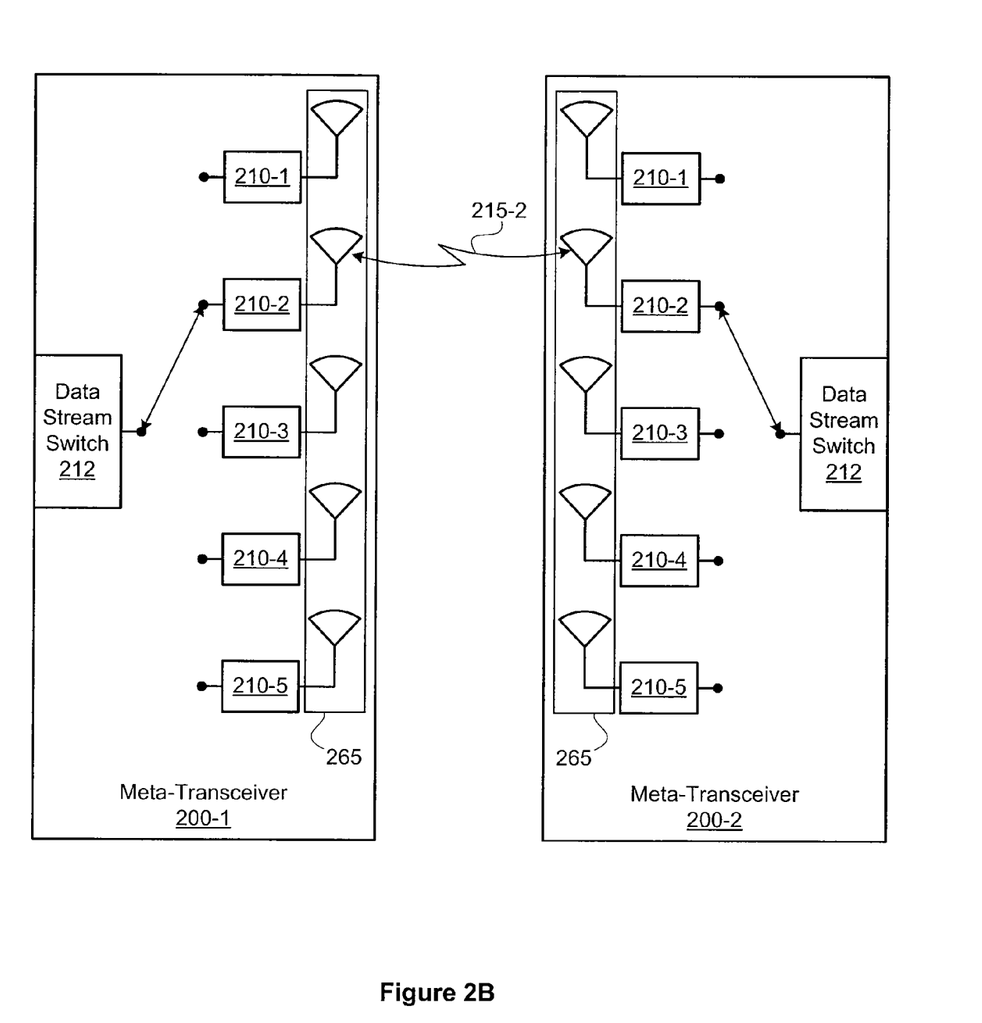
FIG. 2B is conceptual diagram of two meta-transceivers configured to communicate using one channel, according to one embodiment of the present invention.

FIG. 2B is conceptual diagram of two meta-transceivers 200-1, 200-2 configured to communicate using one channel 215-2, according to one embodiment of the present invention. Channel 215-2 may adhere to transmission requirements implemented by digital transceiver 210-2. While digital transceiver 210-2 within meta-transceivers 200-1 and 200-2 are configured to communicate, each other digital transceiver 210 within meta-transceivers 200-1 and 200-2 may be configured to listen for incoming data. In this way, meta-transceivers 200-1 and 200-2 are able to asynchronously hop to another channel, or include one or more additional channels as part of a mutual communication session. A particular digital transceiver 210 may approach a transmission duration limit or duty-cycle limit, requiring that digital transceiver 210 to stop transmitting for some duration of time. In such a scenario, a different digital transceiver 210 may be selected to enable continued communication, for example to enable meta-transceiver 200-1 to continue transmitting data to meta-transceiver 200-2 on a different channel, despite reaching a transmission limitation on channel 215-2.

Figure 2C:
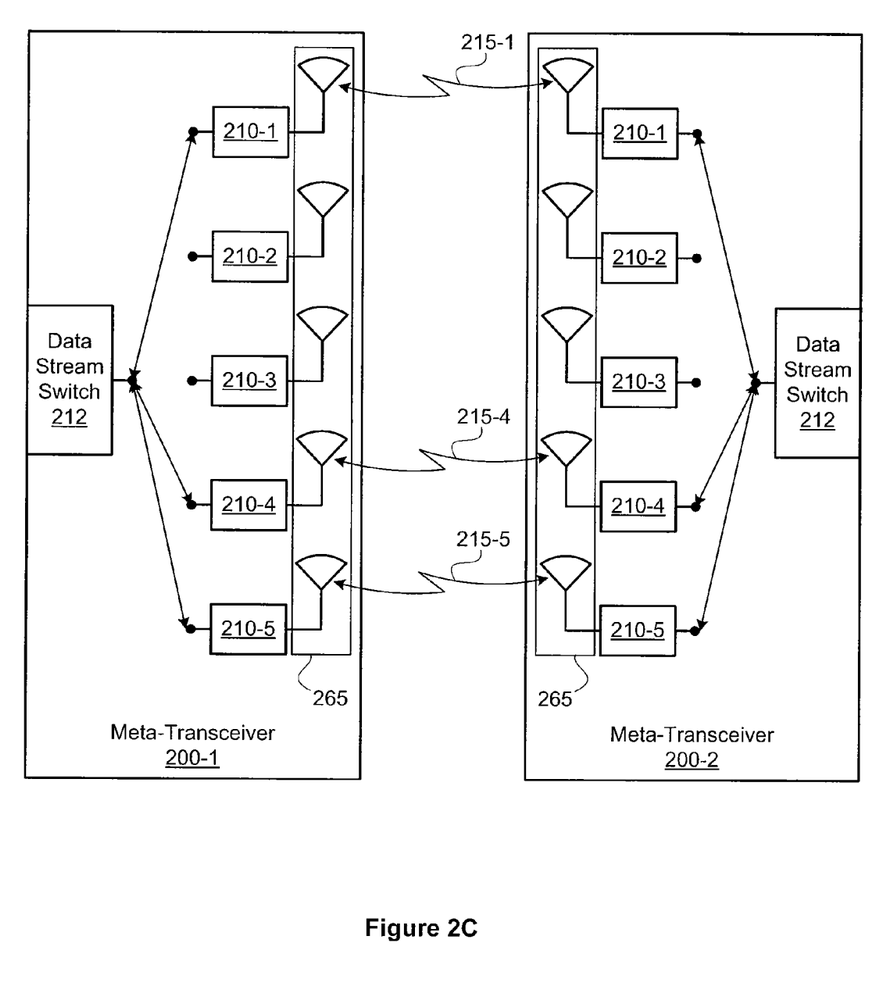
FIG. 2C is a conceptual diagram of two meta-transceivers configured to communicate using multiple channels, according to one embodiment of the present invention.

FIG. 2C is a conceptual diagram of two meta-transceivers 200-1, 200-2 configured to communicate using multiple channels 215-1, 215-4, and 215-5, according to one embodiment of the present invention. Channels 215-1, 215-4, and 215-5 may each have different transmission requirements, limitations, and characteristics.

In one embodiment, meta-transceivers 200-1 and 200-2 bundle channels 215-1, 215-4, and 215-5 for higher throughput. For example, different packets of data within a sequential stream of data are transmitted simultaneously as interleaved packets on channels 215-1, 215-4, and 215-5. In other embodiments, identical data may be transmitted on channels 215-1, 215-4, and 215-5 to improve reliability in a noisy environment. In yet other embodiments, sequential packets of data are transmitted sequentially on 215-1, 215-4, and 215-5 to minimize transmission duty cycle on any one channel. Such an embodiment represents an implementation of frequency hopping. In still other embodiments, meta-transceivers 200-1 and 200-2 use different characteristics of each channel advantageously to improve protocol reliability. For example, if channel 215-1 has a high power but low duty cycle limitation, then this channel may be used to more reliably and quickly acknowledge data transmitted via channels 215-4 and 215-5.

While the above discussion focuses on two meta-transceivers 200-1 and 200-2 communicating, any given meta-transceiver may also communicate simultaneously with other devices, such as other meta-transceivers, SRD systems, and the like. A given meta-transceiver system, such as meta-transceiver system 110 of FIG. 1, may also act as a network node in a wireless mesh network and route data packets from one device to another using any technically feasible routing techniques. In this context, routing may comprise examining a destination address and determining that a different device is either along a route to the destination address or is assigned the destination address. A given route may include redundant paths that should be concurrently attempted. For example, a given data packet may be transmitted to multiple meta-transceivers and follow multiple different routes through a mesh network for reliable delivery to a target node.

Each meta-transceiver system 110 may process ingress data traffic according to any technically feasible packet processing techniques. For example, meta-transceiver system 110 may beneficially perform physical layer translation between different regulatory regimes, data rate conversion, modulation type conversion, application level data translation, security demarcation functions, routing protocol translation, and fragmentation/de-fragmentation functions. Each meta-transceiver system 110 may also act as a source of outbound data, and act as an application end-point for certain applications. Furthermore, each meta-transceiver system 110 may be configured to detect regulatory violations in other devices, as each meta-transceiver 200 is configured to maintain proper transmission requirements state.

While certain transmission configurations are described above, persons skilled in the art will recognize that any digital transceiver system configured to asynchronously select or hop among different channels based on individual, unique transmission requirements for each of the different channels to maintain a communication session is within the scope and spirit of embodiments of the present invention.

Figure 3:
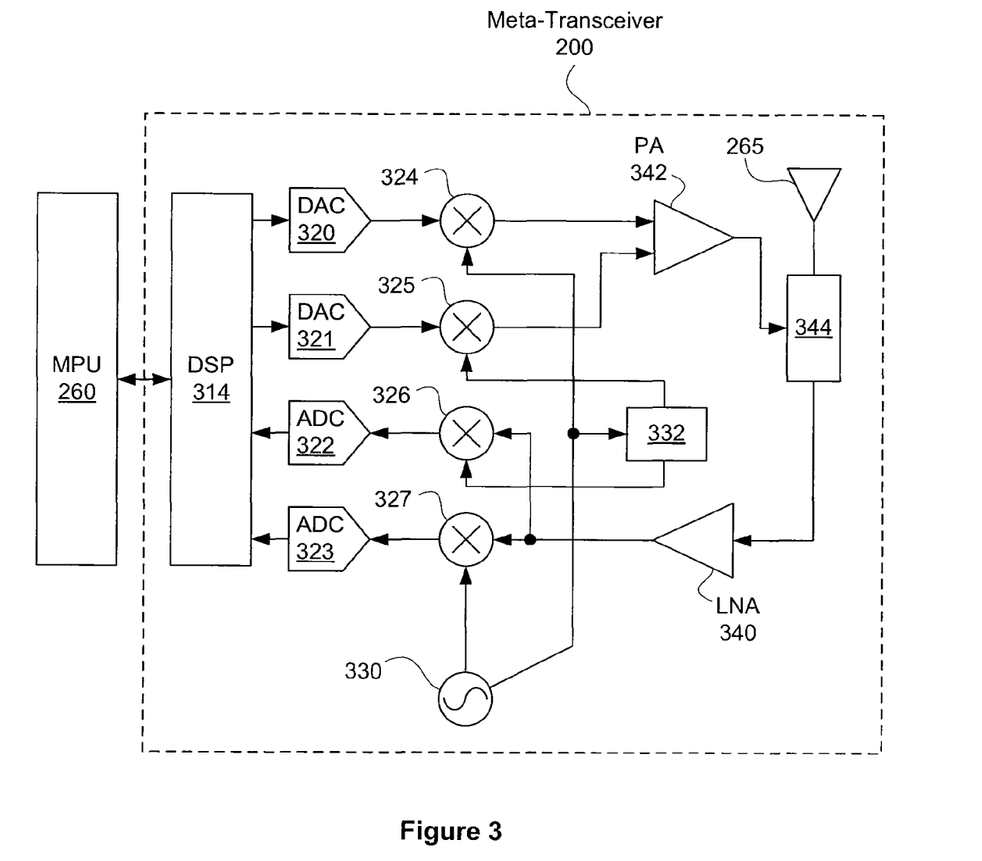
FIG. 3 illustrates a meta-transceiver subsystem, according to one embodiment of the present invention.

FIG. 3 illustrates a meta-transceiver subsystem, such as meta-transceiver 200 of FIG. 2A, according to one embodiment of the present invention. Meta-transceiver 200 may include, without limitation, a digital signal processor (DSP) 314, digital to analog converters (DACs) 320, 321, analog to digital converters (ADCs) 322, 323, analog mixers 324, 325, 326, 327, a phase shifter 332, an oscillator 330, a power amplifier (PA) 342, a low noise amplifier (LNA) 340, an antenna switch 344, and antenna 265.

In one embodiment, the MPU 260 implements procedures for processing data packets transmitted or received as payload data by meta-transceiver 200. The procedures for processing the data packets may include, without limitation, wireless routing, encryption, authentication, protocol translation, and routing between and among different wireless and wired network ports.

DSP 314 implements signal processing procedures for modulating a serialized representation of payload data comprising packets, such as data packets conforming to channel-specific transmission protocols. The serialized representation may encode one or more bits of payload data per modulation symbol or less than one bit per modulation symbol. A receiver may demodulate each modulation symbol to recover the one or more bits of payload data. In one embodiment the one or more bits of payload data are used to generate a corresponding data packet.

DSP 314 may implement multi-channel modulation for simultaneous transmission of independent units of payload data via multiple, independent channels. Each independent channel occupies a different frequency range in a frequency domain representation of a transmitted radio signal. DSP 314 may also implement corresponding signal processing procedures for receiving payload data. The procedures may include, without limitation filtering, energy detection, signal characterization, and simultaneous demodulation of multiple, independent channels.

In one embodiment, DSP 314 is configured to modulate data within each channel using a particular modulation technique for the channel that is selected from a set of different modulation techniques. Any technically feasible modulation, demodulation, filtering, energy detection, and signal characterization techniques may be implemented by DSP 314 without departing the scope and spirit of embodiments of the present invention.

DSP 314 is coupled to DAC 320 and DAC 321. Each DAC 320, 321 is configured to convert a stream of outbound digital values into a corresponding analog signal. The outbound digital values are computed by the signal processing procedures for modulating one or more channels. DSP 314 is also coupled to ADC 322 and ADC 323. Each ADC 322, 323 is configured to sample and quantize an analog signal to generate a stream of inbound digital values. The inbound digital values are processed by the signal processing procedures to demodulate and extract payload data from the inbound digital values.

In one embodiment, DSP 314 generates two modulated streams of outbound digital values, which are converted to corresponding analog quadrature signals by DACs 320, 321. The analog quadrature signals are separately mixed with a radio frequency (RF) carrier signal by analog mixers 324, 325 to generate corresponding quadrature RF signals, each having a frequency domain image centered about the frequency of the RF carrier signal. Oscillator 330 generates the RF carrier signal and phase shifter 332 generates a 90-degree shifted representation of the RF carrier signal for generating quadrature RF signals. PA 342 combines the quadrature RF signals to generate a modulated RF signal, which is coupled through antenna switch 344 to the antenna 265. Antenna 265 converts the modulated RF signal from an electrical representation to an electromagnetic representation for wireless transmission.

Antenna 265 converts incident electromagnetic energy into a received RF signal, which is coupled through antenna switch 344 to LNA 340. LNA 340 is configured to generate an amplified RF signal from the received RF signal and couple the amplified RF signal to analog mixers 326 and 327. The amplified RF signal is characterized as having a signal image centered about an RF carrier frequency. The analog mixer 327 shifts the signal image down in frequency to an in-phase baseband component of the signal image. The signal is in-phase with respect to the RF carrier signal generated by oscillator 330. Analog mixer 326 shifts the signal image down in frequency to a 90-degree shifted baseband component of the signal image. The in-phase and 90-degree shifted baseband signals comprise a quadrature representation of one or more channels within the electrical RF signal. A plurality of different frequency channels may be represented within the baseband signals. DSP 314 is configured to map the stream of inbound digital values, comprising a time domain representation of the baseband signals, to a frequency domain representation of the baseband signals. Persons skilled in the art will recognize that the frequency domain representation may be used to efficiently isolate one data bearing signal within one channel from a signal within a different channel. Similarly, the frequency domain representation may be used to detect noise and interfering transmissions within a given channel.

In one embodiment, oscillator 330 can be programmed to generate one selected frequency from a plurality of possible frequencies. Each of the plurality of frequencies corresponds to a different channel. The selected frequency determines a center channel for a range of channels that are concurrently available for processing by DSP 314 to receive or transmit data. For example, if a frequency range of 4 MHz defines ten channels, then each channel is allocated a bandwidth of 400 kHz. In this example, a frequency range of 2,000 kHz representing five channels is processed by DSP 314 for transmitting or receiving data on one or more of the five channels. If oscillator 330 is programmed to generate a different selected frequency, then a different set of five concurrently available channels may be used for transmitting or receiving data. The center channel may be changed arbitrarily by programming oscillator 330 independently of DSP 314 operating on the concurrently available channels. Meta-transceiver 200 may be configured with an arbitrary number of concurrently available channels, each having an arbitrary bandwidth without departing the scope and spirit of embodiments of the present invention.

In certain embodiments, DSP 314 and MPU 260 are integrated on the same die. Additionally, DAC 320, DAC 321, ADC 322, and ADC 323 may be integrated on the die. In other embodiments, MPU 260 comprises a separate device having a separate die.

Figure 4:
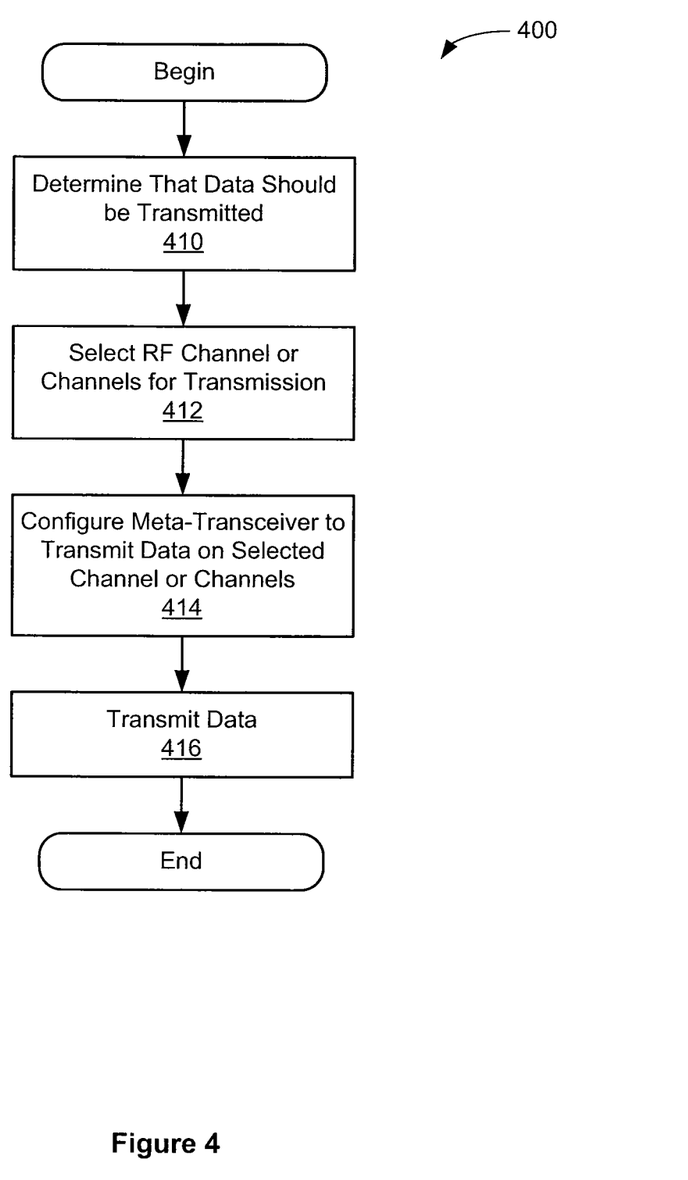
FIG. 4 is a flow diagram of method steps for transmitting a unit of data via a meta-transceiver, according to one embodiment of the invention.

FIG. 4 is a flow diagram of method steps for transmitting a unit of outbound data via a meta-transceiver, according to one embodiment of the invention. Although the method steps are described in conjunction with the systems of FIGS. 1-3, persons of ordinary skill in the art will understand that any system configured to perform the method steps, in any order, is within the scope of the invention.

As shown, a method 400 begins in step 410, where a control processor, such as MPU 260, determines that the outbound data should be transmitted from a local meta-transceiver system to a remote meta-transceiver system. In one scenario, the outbound data is generated within the local meta-transceiver system. In such scenarios, the outbound data may be generated from an application executing within the local meta-transceiver system. A process of generating the outbound data leads to a determination that the outbound data should be transmitted. In other scenarios, the outbound data is derived from inbound data, which is demodulated by a meta-transceiver within the local meta-transceiver system. The meta-transceiver may be configured to receive data from multiple channels simultaneously. In such scenarios, the outbound data comprises a unit of inbound data that needs to be routed to the remote meta-transceiver system, which may further route the unit of data. In one embodiment, a routing decision is made based on a destination address associated with the unit of inbound data. For example, if the destination address is not the local meta-transceiver system, then a determination is made that the outbound data should be transmitted. In this case, the outbound data comprises a destination address and payload data from the unit of inbound data.

In step 412, the control processor selects an RF channel or RF channels, from a set of at least two different channels, over which to transmit the outbound data. A given RF channel may be selected based on transmission requirements, accumulated transmission history information, or a combination thereof. One example of accumulated transmission history comprises prior transmission success rates to a particular target device via a particular channel. A relatively high prior transmission success rate on a given channel to a given target device would increase selection priority for the channel when the outbound data is scheduled to be transmitted to the target device. However, a given channel may only be selected if transmission of the outbound data on the channel will not violate transmission requirements for the channel. For example, if the channel would exceed a duty-cycle limitation by transmitting the outbound data, then the channel may not be selected and a different channel must be selected. When two or more channels are selected, each channel needs to similarly adhere to corresponding transmission requirements to be selected.

In step 414, the control processor configures the meta-transceiver within the meta-transceiver system to transmit data on a selected channel or on selected channels. In one embodiment, configuring the meta-transceiver may include selecting appropriate implementation-dependent parameters and procedures for execution by DSP 314. The method terminates in step 416, where the control processor directs the meta-transceiver to transmit the outbound data on the selected channel or channels.

In sum, a technique for efficiently utilizing available radio frequency spectrum is disclosed. The technique involves a control processor configuring a meta-transceiver to transmit outbound data via one or more channels selected based on transmission requirements associated with each channel. A channel may also be selected based on transmission success rates to a particular target. Application level packet handling, such as routing, may also be performed by the control processor.

One advantage of the disclosed technique is that available radio frequency spectrum may be utilized more efficiently by optimizing use of each available portion of frequency spectrum.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for transmitting outbound data to a remote device via a meta-transceiver, the method comprising:
   determining that the outbound data should be transmitted;
   selecting at least one radio frequency (RF) channel for transmitting the outbound data, wherein the at least one RF channel is selected from a set of two or more RF channels based on a set of transmission requirements associated with the at least one RF channel, wherein each RF channel in the set of two or more RF channels is associated with a different instance of a digital transceiver configured to receive and transmit data via the RF channel; and
   transmitting the outbound data to the remote device via the at least one RF channel.

2. The method of claim 1, wherein determining comprises matching a destination address associated with a previously received packet of data to the remote device.

3. The method of claim 2, wherein the outbound data comprises payload data from the previously received packet of data to be routed to the remote device.

4. The method of claim 1, wherein the outbound data comprises payload data generated by a local control processor for transmission to the remote device.

5. The method of claim 1, wherein the set of transmission requirements includes a listen-before-talk test.

6. The method of claim 1, wherein the set of transmission requirements includes a transmission duty-cycle limitation or a transmission duration limitation.

7. The method of claim 1, wherein the set of transmission requirements includes a transmission power limitation or a transmission bandwidth limitation.

8. The method of claim 1, wherein selecting is further based on a transmission success rate associated with the remote device for each RF channel in the set of two or more RF channels.

9. The method of claim 1, wherein each instance of the digital transceiver is configured to execute within a digital signal processor.

10. A non-transitory computer-readable storage medium including instructions that, when executed by a processor, cause the processor to transmit outbound data to a remote device via a meta-transceiver, by performing the steps of:
    determining that the outbound data should be transmitted;
    selecting at least one radio frequency (RF) channel for transmitting the outbound data, wherein the at least one RF channel is selected from a set of two or more RF channels based on a set of transmission requirements associated with the at least one RF channel, wherein each RF channel in the set of two or more RF channels is associated with a different instance of a digital transceiver configured to receive and transmit data via the RF channel; and
    transmitting the outbound data to the remote device via the at least one RF channel.

11. The computer-readable storage medium of claim 10, wherein determining comprises matching a destination address associated with a previously received packet of data to the remote device.

12. The computer-readable storage medium of claim 11, wherein the outbound data comprises payload data from the previously received packet of data to be routed to the remote device.

13. The computer-readable storage medium of claim 10, wherein the outbound data comprises payload data generated by a local control processor for transmission to the remote device.

14. The computer-readable storage medium of claim 10, wherein the set of transmission requirements includes a listen-before-talk test.

15. The computer-readable storage medium of claim 10, wherein the set of transmission requirements includes a transmission duty-cycle limitation or a transmission duration limitation.

16. The computer-readable storage medium of claim 10, wherein the set of transmission requirements includes a transmission power limitation or a transmission bandwidth limitation.

17. The computer-readable storage medium of claim 10, wherein selecting is further based on a transmission success rate associated with the remote device for each RF channel in the set of two or more RF channels.

18. The computer-readable storage medium of claim 10, wherein each instance of the digital transceiver is configured to execute within a digital signal processor.

19. A wireless computing device, comprising:
    a digital radio circuit configured to generate a radio signal for data transmission and to receive a signal for data reception; and
    a processor that is coupled to the digital radio circuit and configured to:
        determine that the outbound data should be transmitted;
        select at least one radio frequency (RF) channel for transmitting the outbound data, wherein the at least one RF channel is selected from a set of two or more RF channels based on a set of transmission requirements associated with the at least one RF channel, wherein each RF channel in the set of two or more RF channels is associated with a different instance of a digital transceiver configured to receive and transmit data via the RF channel; and
        transmit the outbound data to the remote device via the at least one RF channel.

20. The wireless computing device of claim 19, further comprising a memory that includes instructions that, when executed by the processor, cause the processor to determine, select, and transmit.

21. The method of claim 1, further comprising selecting a first digital transceiver associated with the at least one radio frequency channel for transmitting the outbound data.

22. The method of claim 21, wherein the first digital transceiver is selected via a data stream switch.

23. The method of claim 1, wherein all instances of the digital transceiver are collectively executed within a single digital signal processor.

24. The method of claim 1, wherein the set of transmission requirements comprises a set of one or more limitations adhered to by the meta-transceiver during transmission.

25. The computer-readable storage medium of claim 10, wherein selecting comprises selecting the at least one RF channel based on at least one limitation that is adhered to by the meta-transceiver during transmission and is included in the set of transmission requirements associated with the at least one RF channel.

* * * * *